United States Patent [19]

McEntire et al.

[11] Patent Number: 4,606,837

[45] Date of Patent: Aug. 19, 1986

[54] WATER-GLYCOL FLUIDS MADE FROM POLYOXYALKYLENE THICKENERS

[75] Inventors: Edward E. McEntire; Edward C. Y. Nieh, both of Austin; Robert A. Grigsby, Jr., Georgetown; David R. McCoy, Austin, all of Tex.

[73] Assignee: Texaco Inc., White Plains, N.Y.

[21] Appl. No.: 696,664

[22] Filed: Jan. 30, 1985

[51] Int. Cl.$^4$ ............... C10M 115/04; C10M 173/02
[52] U.S. Cl. .................. 252/73; 252/49.3; 252/52 A; 252/75; 568/606; 568/608; 568/613; 568/618; 568/622; 568/625
[58] Field of Search ............ 252/49.3, 52 A, 73, 252/75, 174.21; 568/606, 608, 613, 618, 622, 625

[56] References Cited

U.S. PATENT DOCUMENTS

| | | | |
|---|---|---|---|
| 2,174,761 | 10/1939 | Schuette et al. | 568/618 |
| 2,425,755 | 8/1947 | Roberts et al. | 252/524 |
| 2,677,700 | 5/1954 | Jackson et al. | 568/625 |
| 3,102,893 | 9/1963 | Gaertner | 568/614 |
| 3,379,644 | 4/1968 | Katzenstein | 252/78.3 |
| 3,567,784 | 3/1971 | Tsatsos et al. | 568/625 |
| 4,491,526 | 1/1985 | Deck | 252/49.3 |
| 4,521,326 | 6/1985 | Seibert et al. | 568/608 |

FOREIGN PATENT DOCUMENTS 2626965 12/1977 Fed. Rep. of Germany ...... 568/606

Primary Examiner—Paul Lieberman
Assistant Examiner—Robert A. Wax
Attorney, Agent, or Firm—Jack H. Park; Kenneth R. Priem; Richard A. Morgan

[57] ABSTRACT

Water soluble thickeners made by alkoxylating monohydric alcohol hydrophobes are described. The monohydric alcohol should have at least 18 carbon atoms to be properly hydrophobic. In addition, a large proportion of ethylene oxide must be added, such that the molar ratio of ethylene oxide to monohydric alcohol hydrophobe is at least 40:1. Improved results are obtained if 8-15 moles of propylene oxide are added as a block to the single mole of hydrophobe first. The alkoxylations are necessary to provide the desired viscosities and hydrophilic nature. These thickeners are particularly useful in the glycol-water based fluids of this invention.

14 Claims, No Drawings

WATER-GLYCOL FLUIDS MADE FROM POLYOXYALKYLENE THICKENERS

BACKGROUND OF THE INVENTION

1. Field of the Invention

The invention relates to the use of water-soluble thickeners and more particularly relates to the use of high molecular weight, polyoxyalkylene water-soluble thickeners made using hydrophobic alcohols for glycol-water based hydraulic fluid applications.

2. Other Thickeners in the Field

Previous thickeners have been typically prepared by the reaction of mixtures of ethylene oxide and propylene oxide together with polyoxyalkylene glycol initiators to give materials having molecular weights greater than 5000. Typical ratios range from 2:1 to 4:1 in proportions of oxide mixture to initiator. Undiluted viscosities of the resultant products range between 100 centistokes and 2000 centistokes at 100° F. Representative commercial fluids are the JEFFOX ® synthetic functional fluids manufactured by Texaco Chemical Co.

An object of the invention is to produce water-soluble fluids with high viscosities by an economical manner. It is expected that the fluids would be particularly useful as thickening agents for fire-resistant glycol-water hydraulic fluids for use in refineries, coal mines, steel mills, machine shops, and military equipment. Functional fluid uses as brake fluids, lubricants and starting materials for surfactants, plasticizers and resins are also anticipated.

High molecular weight polyether block polymers having high viscosities may be made by the sequential alkoxylation of a polyfunctional initiator with alkylene epoxide components according to U.S. Pat. No. 3,535,307 to Moss, et al. High molecular weight polyether polyols according to U.S. Pat. No. 3,829,506 to Schmolka, et al. are made by the copolymerization of low molecular weight alkylene oxides and α-olefin oxides containing from ten to twenty carbon atoms with low molecular weight compounds having two to six hydroxyl groups.

However, more pertinent to the instant invention are thickeners made using mono-hydric alcohols as initiators. For example, U.S. Pat. No. 2,174,761 to Schuette, et al. teaches that water-soluble products can be obtained by reacting an organic compound containing at least one hydroxy group in the molecule (such as propyl alcohol, amyl alcohol, benzyl alcohol, phenols, cresols, etc.) with an alkylene oxide having at least 3 carbon atoms and then effecting a "water-solubilizing step" which essentially involves adding an ethylene oxide "cap". Although the ethylene oxide cap may involve two to twenty moles of ethylene oxide per mole of alcohol, the higher alkylene oxide proportion is much reduced, on the order of 2 to 4 moles per mole of alcoholic initiator. The reaction of monohydric alcohols with alkylene oxides such as ethylene oxide or propylene oxide with the subsequent addition of a polyether-substituted chlorohydrin is revealed in U.S. Pat. No. 3,102,893 to Gaertner. Again, the mole ratio of alcohol to alkylene oxide is rather low: from less than 1:1 to 1:9.

Monohydric alcohols, such as methanol and butanol, but particularly glycols, may be reacted repeatedly with ethylene oxide and higher alkylene oxide groups to give a metal quenching medium having average molecular weights in the 600 to 40,000 range as seen in U.S. Pat. No. 3,220,893 to Blackwood, et al. U.S. Pat. No. 3,424,817 to Hicks teaches a process for preparing fusible polymeric polyhydroxy polyether resins by reacting a diepoxide resin and a monohydric alcohol in a mole ratio of about 1:1. See also U.S. Pat. No. 3,374,286 to Hicks where a monoepoxide replaces the diepoxide. Further, U.S. Pat. No. 3,538,033 to Hayashi, et al. reveals that polyoxyalkylene compounds having thickening properties may be prepared by reacting a diepoxide with a monohydric aliphatic alcohol (such as octadecyl alcohol) or an alkyl phenol (such as nonylphenol or dinonylphenol) which has at least 12 carbon atoms and with which has been reacted an alkylene oxide in a number of moles not less than 20.

Thickeners for aqueous liquids may also be obtained by capping a liquid straight chain polyoxyalkylene compound derived from ethylene oxide or ethylene oxide and one lower alkylene oxide with at least one active hydrogen-containing initiator having only one active hydrogen atom, according to U.S. Pat. No. 4,288,639 to Camp. The initiator is preferably a monohydric alcohol having 12 to 18 carbon atoms and the capping agent is an alpha-olefin oxide having preferably 12 to 18 carbon atoms.

Particularly relevant to the invention at issue is U.S. Pat. No. 3,379,644 to Katzenstein which discloses ethoxylated long chain alkylated phenols as thickening agents useful in hydraulic fluids. However, this patent only teaches a rather limited range of molar ratio of ethylene oxide to alkylated phenol, namely 12:1 to 18.5:1. In addition, this patent teaches that as the ethylene oxide content increases, the viscosity of the resultant thickener decreases (compare Example IV and Example V). Also of interest is U.S. Pat. No. 2,425,755 to Roberts, et al. which teaches that ethylene oxide and propylene oxide may be added to low molecular weight alcohols (ten or less carbon atoms) to give viscous materials useful as hydraulic fluids without water-glycol dilution.

SUMMARY OF THE INVENTION

The invention concerns glycol-water based fluids having a glycol component, water and an effective amount of a water soluble thickener. The water soluble polyoxyalkylene thickener is made by reacting an alkylene oxide component with a monohydric alcohol hydrophobe having at least 18 carbon atoms. Part of the alkylene oxide component must be a large ethylene oxide block addition where the mole ratio of ethylene oxide to monohydric alcohol hydrophobe is in the range from 40:1 to 500:1.

These glycol-water based fluids find utility as hydraulic fluids in mines, aircraft and military equipment and wherever their non-flammable character is essential. In these capacities dyes, corrosion inhibitors and antiwear compounds may be incorporated to augment the desirable properties.

DETAILED DESCRIPTION OF THE PREFERRED EMBODIMENTS

Monofunctional alcohols prepared by the alkoxylation of a hydrophobic unit have been found to produce compounds suitable as thickeners for aqueous solutions. These polymeric compounds are unique and useful in that they are more efficient thickeners than conventional alkoxylates of much higher molecular weight, and they are stable to shearing forces such as those caused by pumping or stirring.

The polymers useful in this invention thicken solutions of water and ethylene glycol efficiently. Such solutions, which contain other additives to prevent corrosion, are used as fire retardant hydraulic fluids where flammable hydrocarbon fluids cannot be used. The polymers provide the thickening necessary to inhibit leaking in the hydraulic system in which they are used.

The desired structures for these polymeric thickeners are shown in the formulae below.

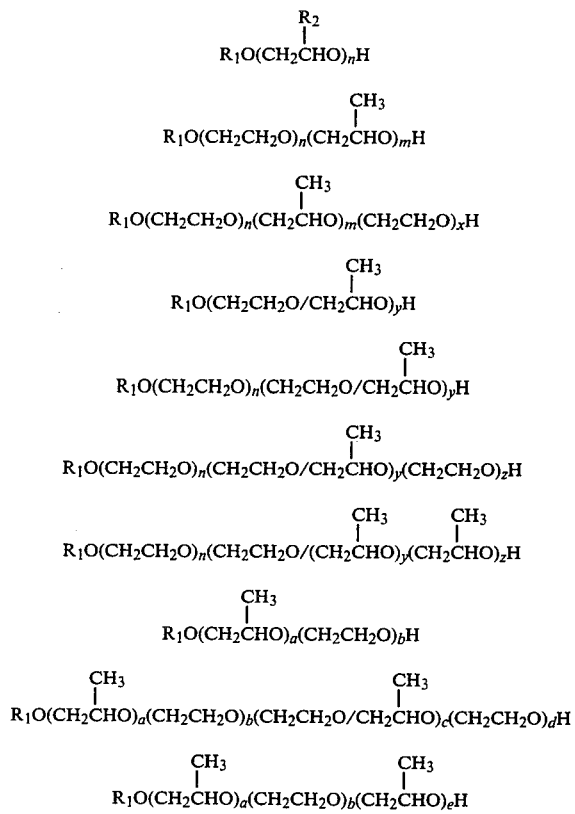

where $R_1$ is a hydrophobic group of from about 10 to 50 carbon atoms composed only of carbon and hydrogen, more preferably 18 to 40 carbon atoms, and is the residue of a monohydric alcohol initiator, $R_2$ is hydrogen, methyl or ethyl, and n, m, x, y and z are independently from about 5 to 500, though n and b are more preferably 40 to 500, with the added restriction that the molecular weight of the hydrophilic portion of each molecule be between about 1000 and 20,000. In the last three formulas, a may range from 2 to 30, preferably 8 to 15; b must range from 40 to 500, preferably 50 to 400, and c, d and e may range from 10 to 200, preferably 10 to 100.

The slash mark in the formula indicates a mixed or hetero polymer instead of a block polymer.

However, because the polymer thickeners of this invention are more accurately a distribution of many different molecules, it is preferred that the thickeners be defined in product-by-process terms rather than in structural formula terms.

The compounds may incorporate random or block olefin oxide into the polymer. The polymers may be made by reacting alkylene oxides such as ethylene oxide, 1,2-propylene oxide, 1,2-butylene oxides or mixtures thereof with a monohydric alcohol or phenol in the presence of alkaline catalysts such as NaOH or acidic catalysts such as $BF_3$. Other catalysts commonly used to made alkoxylates include $KOCH_3$, KOH, CsOH, and LiOH. Many other catalysts which would be useful are well known in the art.

Although block and random copolymers of alkylene oxides may be used, a preferred embodiment is to use ethylene oxide only in building the very large hydrophile portion of the molecule. In this especially preferred embodiment, the inventive compositions may be called very highly ethoxylated hydrophobes. Generally, at least 40 moles of ethylene oxide should be added directly onto the monohydric alcohol hydrophobe. The upper limit of alkoxylation should be set by the experimenter depending on the properties desired. Eventually a point of diminishing return will be reached at which further addition will no longer provide an incremental increase in viscosity and may even cause the thickener to gel. An especially preferred range of mole ratios of alkylene oxide component to monohydric alcohol is 50:1 to 400:1.

In another especially preferred embodiment of the invention, only propylene oxide is first added to the monohydric hydrophobe. Generally, from 2 to 30 moles of propylene oxide should be added per mole of monohydric hydrophobe, preferably 8 to 15 moles. This propoxylated adduct may be termed an intermediate. The intermediate contains one mole of the hydrophobe (or more accurately, its residue after reaction). The next step is that a large ethylene oxide polymer block must be added (as in the previously described embodiment). As noted, the mole ratio of ethylene oxide to intermediate (or hydrophobe residue) should be from 40:1 to 500:1, preferably 50:1 to 400:1. The resultant thickener may remain ethylene oxide terminated or may be additionally chained out with propylene oxide, or a mixture of ethylene oxide and propylene oxide, optionally capped with ethylene oxide. Of course, as in the case where ethylene oxide is used first, other alkylene oxides, such as butylene oxide, may be used as random or block co-polymers in these various combinations.

A wide variety of monohydric alcohol hydrophobes may be useful in this invention. To be of sufficient hydrophobic nature, the monohydric alcohol should have at least 18 carbon atoms, again where the upper limit should be set by the experimenter depending on the desired characteristics of the water-soluble thickeners. Preferably, the monohydric alcohol should have from 18 to 30 or more carbon atoms. Illustrative aliphatic mono-alcohols include 1-octadecanol, behenyl alcohol, cholesterol, 2-hydroxyoctadecyl octadecyl ether, 1,3-octadecyloxy-2-propanol and the like. Preferably, the mono-alcohol hydrophobe is a phenol such as dinonylphenol, dodecylphenol, didodecylphenol, polyisobutylphenol (e.g. tri- and tetraisobutylphenol), dioctylphenol and the like. Dinonylphenol is an especially preferred hydrophobe. These recitations of monohydric alcohol hydrophobes are meant for illustrative purposes only and are not intended to limit the invention. Hydrophobes having less than 18 carbon atoms may also be found to give useful thickeners.

The alkoxylation reaction to make the subject thickeners may be conducted under mild temperatures, from 20° to 150° C. and mild pressures, from atmospheric to about 200 psi. The reaction time for these alkoxylations will vary depending on the amount of alkylene oxide added. Typically, however, the reaction time ranges from 1 to 10 hours.

The polymers of this invention are particularly useful thickeners for water-glycol fluids over conventional thickeners because much less thickener is required to achieve the same thickening. For example, a conventional thickener used in water-glycol, fire-retardant hydraulic fluids is JEFFOX ® WT-100,000 thickener, available from Texaco Chemical Co. This commercial polymer is a dihydric high molecular weight, water soluble ethylene oxide/propylene oxide copolymer. The amount of this polymer required to produce a solution in 1:1 (weight/weight) ethylene glycol-water which has a viscosity at 40° C. of 40 centistokes (cs) is 20 wt.%. The viscosity of this same solution at 65° C. is 20 cs. A polymer of similar composition is UCON ® 75H 380,000 made by Union Carbide. The inventive polymers described above are of higher molecular weight, have both hydrophobic and hydrophilic sections and contain a large ethylene oxide block section; thus less is required to provide the same amount of thickening. For example, about 15 wt.% of the prior art polymer is required to produce a solution in ethylene glycol-water which has a 40° C. viscosity of 40 cs. The viscosity of the same solution at 65° C. is 19.5 cs. By way of contrast, the same results can be obtained with only about 10 wt.% of the inventive polymers described above.

The glycol-water based fluids of this invention contain water, a glycol component and a proportion of a water-soluble polyoxyalkylene thickener; namely, those described above. The glycol component may be any suitable glycol. Ethylene glycol and/or propylene glycol are preferred. The weight proportion of glycol component to water should range from 2:1 to 0.5:1 and is preferably 1.5:1 to 1:1. The proportion of the polymeric thickeners of this invention in the water-glycol based fluid should be from 5 to 20 wt.% based on the glycol-water proportion and is preferably from 7 to 12 wt.%. Of course, the proportion of thickener added depends on the desired thickening effect.

Although even higher molecular weight polymers can be prepared via prior methods, handling of the anhydrous polymers becomes very difficult due to their high viscosities. For example, anhydrous JEFFOX ® WT-100,000 has a viscosity of 20,000 cs at 100° F. and a 210° F. viscosity of 2,600 cs. Processing of these commercial materials also becomes difficult. Another disadvantage to polymers of even higher molecular weight is their shear instability. When high molecular weight polymer solutions are pumped or stirred vigorously, they break down and lose thickening power irreversibly. However, the polymers of this invention described above are of much lower molecular weight (as compared with the conventional polymeric thickeners mentioned above) and thus would not be subject to the irreversible shear losses in viscosity which can be found in hydraulic systems. Again, even less of the polymer is required to accomplish thickening as shown in the examples.

The following examples will further illustrate the invention, but they are not intended to limit the scope of the invention in any manner.

EXAMPLE 1

To a jacketed 2-gallon reactor were charged 1961 g of dinonylphenol* (the hydroxyl number is 159 mg KOH/g) and 32.5 g of a 45% solution of potassium hydroxide in water. The kettle was sealed and evacuated while stirring and heating to 130° C. Nitrogen was bubbled through the mixture while at 130° C. for about one hour. Then at 125° to 135° C., 4258 g ethylene oxide was added gradually over two hours. After the addition was complete, the temperature was maintained for one hour, then the reactor was vented and the product purged with nitrogen. The product was cooled and recovered. A 10% solution of the product in water had a viscosity of 3.6 cs at 100° F. The corrected hydroxyl number of the product was 52.1 mg KOH/g. The neat viscosity of the product was 237 cs at 100° F.

*Available from Texaco Chemical Co.

EXAMPLE 2

A two-gallon reactor was charged with 800 g of the product of Example 1 and 20 g of 45% potassium hydroxide in solution. The kettle was sealed, evacuated, and held at 120°–125° C. for 30 minutes. Over three hours, 4177 g ethylene oxide was added at about 120° C. Then the temperature was held at 120° C. for one hour and the product recovered at about 90° C. Upon cooling, the product solidified into a waxy substance. The product was characterized by its corrected hydroxyl number of 8.2 mg KOH/g and its viscosity of 539 cs at 210° F.

EXAMPLE 3

A product was made in a manner similar to that of Example 2, but more ethylene oxide was added. It was characterized by a hydroxyl number of 6.93 (corrected) mg KOH/g and a viscosity of 1143 cs at 210° F. Eight and ten percent solutions of the product were prepared in ethylene glycol-water (1:1, w/w). Their respective viscosities were 18.9 cs at 40° C. and 49.9 cs at 40° C. The 65° C. viscosities of these same solutions were 8.25 cs and 20.6 cs, respectively. Extrapolation between the data above led to an amount of only 9.4% of the reaction product required to produce a 40 cs at 40° C. solution in ethylene glycolwater (1:1 w/w) as compared with 20 wt.% and 15.7% for the commercial products noted earlier. Surprisingly, the thickener of Example 3 is of a lower molecular weight than either of these commercial products.

EXAMPLE 4

An experiment similar to Example 1 was performed, but 1-octadecanol was used instead of dinonylphenol as the starting material. The initial charge was 1080 g octadecanol and 20 g 45% KOH, and 3168 g ethylene oxide was added. The product was characterized by its hydroxyl number (corrected) of 55.8 mg KOH/g and its viscosity of 17.8 cs at 210° F.

EXAMPLE 5

To a three-gallon reactor was charged 2388 g of the product of Example 4. A nitrogen atmosphere was maintained while the reactor contents were heated to 120° C. Then 4154 g of ethylene oxide was added over three hours. After a 45-minute holding period at 120°, 2151 g of product was drained from the reactor. The product solidified on cooling and was characterized by its corrected hydroxyl number of 18.2 and 210° F. viscosity of 69 cs.

EXAMPLE 6

In an experiment similar to Example 5, the intermediate from Example 5 (350 g) was reacted with 234 g of ethylene oxide followed by 110.3 g of propylene oxide. The product was characterized by its hydroxyl number of 14.1 mg KOH/g and its 210° F. viscosity of 182 cs. A 10% aqueous solution was prepared, which had a cloud point of 74.2° C.

EXAMPLE 7

In an experiment similar to Example 2, the product from Example 1 was further ethoxylated to give a product with a high hydroxyl number of 9.1 mg KOH/g (corrected) and a 210° F. viscosity of 645 cs.

EXAMPLE 8

In an experiment similar to Example 1, 1452 g of SURFONIC® N-60 (nonylphenol 6-mole ethoxylate from Texaco Chemical Co.) and 30 g 45% KOH and a 3.3 g di-tert-butyl-p-cresol (anti-oxidant) were combined. Water was removed by heating and nitrogen stripping as before and 4186 g ethylene oxide was added at 130° C. over 3.5 hours. After digesting, the product was recovered, which was characterized by its corrected hydroxyl number of 31.9 mg KOH/g and its 210° F. viscosity of 54.5 cs.

EXAMPLE 9

To a reactor was charged 1000 g of the intermediate from Example 8 under a nitrogen atmosphere at 130° C. reaction temperature, 2538 g of an ethylene oxide (65%)-propylene oxide (35%) mixture was added at 130° C. over five hours. After digesting the mixture at 125° C., the product was recovered. The product was a solid with a hydroxyl number of 9.57 (corrected) and a 210° F. viscosity of 217 cs. A 10% aqueous solution of the product had a cloud point of 69° C.

EXAMPLE 10

To 1122 g of a compound identical to the product in Example 1 (except 55% more KOH was added), 968 g of ethylene oxide was added at 120° C. over 1.1 hours. After digesting at 120° for two hours, 4500 g of mixed ethylene oxide (90%)-propylene oxide (10%) was added at 120° C. over 4.7 hours. Digesting 1.1 hours and cooling to 87° produced a product which solidified on further cooling. The product was characterized by its hydroxyl number of 9.35 mg KOH/g and its 210° F. viscosity of 2587 cs at 40° C. A 10% aqueous solution had a cloud point of 90° C.

EXAMPLE 11

To a one-liter kettle were charged 130 g cholesterol and 7.26 g 25% sodium methoxide in methanol. The kettle was heated to 150° C. and evacuated to 30 mm of mercury. Nitrogen was purged through the mixture for 20 minutes. Then at 150° C. 951 g ethylene oxide was added over five hours. After digesting for one hour at 130°, the product was recovered and characterized by its corrected hydroxyl no. of 35.3 and its viscosity of 72 cs at 210° F.

EXAMPLE 12

To a one-liter kettle was charged 200 g of the product of Example 11. After heating in an inert atmosphere to 125°–130° C., 204 g of ethylene oxide was added over 2.6 hours. After a short digestion period at 125° C., the product was recovered which had a 210° F. viscosity of 148 cs and a hydroxyl number of 18.0 mg KOH/mg (corrected).

EXAMPLE 13

The dinonylphenol ethoxylate of Example 7, 2000 g, was charged to a two-gallon kettle equipped with a stirrer. The kettle was padded with nitrogen and the contents heated to 118° C. Then 198 g of propylene oxide was added at 118° C. over five minutes followed by a one-hour digestion at 118° C. Then 1109 g of the intermediate was drained from the kettle. To the remainder of the intermediate was added 200 g of propylene oxide over 20 minutes at 118°, followed by a digestion at 117° of one hour. The product was recovered and characterized by its hydroxyl number of 17.1 mg KOH/g and its viscosity at 210° F. of 463. The intermediate had a hydroxyl number of 13.0 mg KOH/g and a 210° F. viscosity of 534 cs.

EXAMPLE 14

In an experiment simlar to Examples 4 and 5, an ethoxylate of 1-octadecanol was prepared containing more ethylene oxide. It is characterized by its corrected hydroxyl number of 11.0 and its 210° F. viscosity of 263 cs.

EXAMPLES 15 THROUGH 25

Solutions in 1:1 (weight/weight) ethylene glycol-water were prepared to determine the amount of polymer required to produce a 40° C. viscosity of 40 cs. The viscosities of these same solutions were determined at 65° C. to see what the thinning would be on heating. However, the 40° C. viscosities are much more important being closer to actual application temperatures. The data are recorded in the table below.

TABLE I

THICKENED SOLUTIONS

| Example No. | Product of Example No. | Amount of Polymer Required to Produce 40 cs at 40° C. (%) | Viscosity of Solution at 65° C. (cs) |
|---|---|---|---|
| 15 | 2 | 10.5 | 16.2 |
| 16 | 3 | 9.4 | 17 |
| 17 | 5 | 14.3 | 16 |
| 18 | 6 | >12 | ca. 10 |
| 19 | 7 | 10.5 | 16.3 |
| 20 | 9 | 25.5 | 16.5 |
| 21 | 10 | 11.2 | 15 |
| 22 | 12 | 16.2 | 16.5 |
| 23 | 13* | 11.1 | 16 |
| 24 | 13 | 10.1 | 25 |
| 25 | 14 | 12.5 | 15.5 |

*Intermediate

As may be seen in Examples 15–25, in general, even less of the polymers of the previous examples are required than the conventional polymers to produce 40 cs solutions at 40° C., noted earlier. Therefore, the polymers of the instant invention should be more cost effective. Worthy of note are the 65° C. solution viscosities which are not too different from those of the solution of the conventional polymers.

A further advantage of these thickeners is their low neat viscosities. As shown in Examples 1–4, the neat polymer viscosities at 210° F. are typically less than 1000 cs, whereas conventional polymer viscosities nearly always exceed this value if they are useful as thickeners for water-glycol solutions. These lower viscosities simplify handling and transportation of these polymers.

In U.S. Pat. No. 3,379,644 it was taught that as ethylene oxide was added to dinonylphenol, that the viscosity of the resultant thickener decreased as the amount of ethylene oxide added increased. Compare Example IV where 65.8% of the ethoxylated dinonylphenol is ethylene oxide with Example V where 70% of the thickener is ethylene oxide. For each concentration in a 65:35 ethylene glycol/water mix, the viscosity is lower for the Example V materials than for the Example IV thickeners. Compare the 18% concentrations of 43.53 v. 14.95.

The following information was calculated from Examples IV and V of U.S. Pat. No. 3,379,644 which further reveals its teaching that the viscosity decreases as the moles of ethylene oxide added increase.

TABLE II

| Ethoxylates of Dinonylphenol (U.S. Pat. No. 3,379,644) | | | |
| --- | --- | --- | --- |
| Example | Concentration of Ethoxylated Dinonylphenol in Ethylene Glycol-Water (50/50 wt. %) | Calculated Moles of EO on Dinonylphenol | Viscosity at 100° F. (cs) |
| IV | 8% | 15.1 | 8.3 |
| V | 8%* | 18.4 | 5.0 |

*The viscosity at this concentration was calculated by linear regression

It was surprisingly discovered in the instant research that this trend holds true only for a short range. Once about 40 moles of ethylene oxide is added, the viscosity begins to increase again, as seen in Table III. The materials were prepared as in Example 2. The inventors have not found this teaching presented elsewhere, and this is why the mole ratio of alkylene oxide to hydrophobe should be at least 40:1 and is preferably 50:1 to 400:1.

TABLE III

| ETHOXYLATES OF DINONYLPHENOL | | |
| --- | --- | --- |
| Run No. | Moles of EO on Dinonylphenol | Viscosity of solution[1] at 100° F., cs |
| A | 8 | —[2] |
| B | 12 | 16 |
| C | 15 | 16 |
| D | 18 | 4 |
| E | 40 | 6 |
| F | 70 | 11 |
| G | 100 | 17 |
| H | 132 | 20 |
| I | 157 | 25 |
| J | 220 | 33 |
| K | 410 | 44 |

[1] The solution was prepared by mixing 8.0 g of ethoxylate of dimonylphenol with 46.0 g of ethylene glycol and 46.0 g of deionized water.
[2] This sample, when mixed, had two layers. The viscosity at 100° F. was not measured.

The next series of examples will illustrate thickeners and fluids where about 8 to 15 moles of propylene oxide are first added to the monohydric alcohol hydrophobe before other alkylene oxide components are added. Table IV summarizes the properties of these various thickening agents. Example 26 is representative of the thickeners prepared above. The un-propoxylated material of Example 26 will thicken a 40:60 wt.% solution of water/ethylene glycol to 37.6 cs at 40° C. when used at a concentration of 11.20 wt.%. However, if dinonylphenol is propoxylated prior to ethoxylation, the amount required to thicken a water-glycol (40/60 wt.%) solution to the same level is reduced. The amount required to thicken the water-glycol solution to 38.6 cs at 40° C. depends on the number of moles of propylene oxide added to the hydrophobe prior to ethoxylation. The highest thickening efficiency of this type of product is realized when about 8 to 12 moles of propylene oxide are added to dinonylphenol prior to ethoxylation. In addition to improved efficiency, the products containing propoxy groups added first have improved pour points.

Examples 32-34 demonstrate the synthesis of thickeners with various amounts of ethylene oxide added to the thickener after propylene oxide was added to dinonylphenol. The most efficient thickener of these examples, Example 34, contains the largest number of ethoxylate groups.

Examples 35-38 describe the syntheses of thickeners which have been capped off using propylene oxide.

Examples 39-41 show syntheses of thickeners which have additional propoxy groups located in the middle of the ethoxylate chain. Again, the improvement of using propoxy groups is illustrated when Example 41 is compared with Example 42. Example 41 was made by propoxylating dinonylphenol (DNP) with 10 moles of propylene oxide (PO) prior to adding the rest of the alkoxy groups. Examples 42 was not made with 10 moles of PO prior to other alkoxylation. The reported viscosities of these two examples, when compared, show that the Example 41 thickener is more efficient than the Example 42 thickener (12.09 wt.% required vs. 14.2 wt.%).

EXAMPLE 26

Synthesis of DNP+132 EO

To a three-gallon kettle equipped with a stirrer and a source of nitrogen, dinonylphenol (6.06 lb) and aqueous potassium hydroxide (45%, 69.0 g) were charged. The kettle was purged with nitrogen while the contents of the kettle were heated to 110° C. A vacuum was pulled on the kettle for 30 minutes to remove the water from the system. Nitrogen replaced the vacuum and ethylene oxide (31.8 lb) was added to the reactor such that the pressure in the reactor was 60 psig. The reaction was held at 110° C. until a constant pressure was reached. The amount recovered from the kettle was 37.50 lb.

EXAMPLE 27

Synthesis of DNP+2 PO+132 EO

To a three-gallon kettle equipped with a stirrer and a source of nitrogen, dinonylphenol (2.0 lb) and aqueous potassium hydroxide (45%, 20.0 g) were charged. The kettle was purged with nitrogen while the contents of the kettle were heated to 130° C. for 40 minutes to remove the water. The reactor was closed and 2 psig of nitrogen was added to the kettle. Propylene oxide (0.65 lb) was slowly added to the reactor such that the pressure in the reactor was 60 psig. When all of the propylene oxide was added, the contents of the reactor were heated at 130° C. until the pressure reached a constant value. The reactor was heated to 140° C. and ethylene oxide (34.10 lb) was added to the reactor such that the pressure in the reactor was 60 psig. The reaction was held at 140° C. until a constant pressure was reached. The amount recovered from the kettle was 36.59 lb.

EXAMPLE 28

Synthesis of DNP+5 PO+132 EO

To a three-gallon kettle equipped with a stirrer and a source of nitrogen, dinonylphenol (2.0 lb) and aqueous potassium hydroxide (45%, 20.0 g) were charged. The kettle was purged with nitrogen while the contents of the kettle were heated to 130° C. for 40 minutes to remove the water. The reactor was closed and 2 psig of nitrogen was added to the kettle. The propylene oxide (1.53 lb) was slowly added to the reactor such that the pressure in the reactor was 60 psig. When all of the propylene oxide was added, the contents of the reactor were heated at 130° C. until the pressure reached a constant value. The reactor was heated to 140° C. and ethylene oxide (34.20 lb) was added to the reactor such that the pressure in the reactor was 60 psig. The reaction was held at 140° C. until a constant pressure was reached. The amount recovered from the kettle was 37.64 lb.

EXAMPLE 29

Synthesis of DNP+10 PO+132 EO

To a three-gallon kettle equipped with a stirrer and a source of nitrogen, a product similar to Example 43 (2.00 lb) was charged to the reactor. The kettle was purged with nitrogen while the contents of the kettle were heated to 140° C. The reactor was closed and 2 psig of nitrogen was added to the kettle. Ethylene oxide (12.70 lb) was added to the reactor such that the pressure in the reactor was 60 psig. The reaction was held at 140° C. until a constant pressure was reached. The amount recovered from the kettle was 14.80 lb.

EXAMPLE 30

Synthesis of DNP+20 PO+132 EO

To a three-gallon kettle equipped with a stirrer and a source of nitrogen, a product similar to Example 43 (2.00 lb) was charged to the reactor. The kettle was purged with nitrogen while the contents of the kettle were heated to 130° C. The reactor was closed and 2 psig of nitrogen was added to the kettle. Propylene oxide (1.30 lb) was added to the kettle such that the pressure remained at 60 psig in the reactor. The contents of the reactor were held at 130° C. until a constant pressure was reached. The reactor was heated to 140° C. and ethylene oxide (12.70 lb) was added to the reactor such that the pressure in the reactor was 60 psig. The reaction was held at 140° C. until a constant pressure was reached. The amount recovered from the kettle was 15.96 lb.

EXAMPLE 31

Synthesis of DNP+30 PO+132 EO

To a three-gallon kettle equipped with a stirrer and a source of nitrogen, a product similar to Example 43 (2.00 lb) was charged to the reactor. The kettle was purged with nitrogen while the contents of the kettle were heated to 130° C. The reactor was closed and 2 psig of nitrogen was added to the kettle. Propylene oxide (2.60 lb) was added to the kettle such that the pressure remained at 60 psig in the reactor. The contents of the reactor were held at 130° C. until a constant pressure was reached. The reactor was heated to 140° C. and ethylene oxide (12.70 lb) was added to the reactor such that the pressure in the reactor was 60 psig. The reaction was held at 140° C. until a constant pressure was reached. The amount recovered from the kettle was 17.33 lb.

EXAMPLE 32

Synthesis of DNP+10 PO+60 EO

To a three-gallon kettle equipped with a stirrer and a source of nitrogen, the product made in Example 43 (6.0 lb) was charged. The kettle was purged with nitrogen while the contents of the kettle were heated to 140° C. The reactor was closed and 2 psig of nitrogen was added to the kettle. Ethylene oxide (19.8 lb) was slowly added to the reaction such that the pressure in the reactor was 60 psig. When all of the propylene oxide was added, the contents of the reactor were heated at 130° C. until the pressure reached a constant value. The reactor was cooled to 60° C. and the contents of the reactor were removed. The amount recovered from the kettle was 25.00 lb.

EXAMPLE 33

Synthesis of DNP+10 PO+100 EO

In a manner similar to Example 32, the product made in Example 43 (2.00 lb) and ethylene oxide (9.59 lb) were reacted together to yield 11.30 lb of a product which corresponded to dinonylphenol+10 PO+100 EO.

EXAMPLE 34

Synthesis of DNP+10 PO+150 EO

In a manner similar to Example 32, the product made in Example 43 (4.00 lb) and ethylene oxide (28.78 lb) were reacted together to yield 32.57 lb of a product which corresponded to dinonyphenol+10 PO+150 EO.

EXAMPLE 35

Synthesis of DNP+10 PO+132 EO+10 PO

A product similar to Example 29 (9.00 lb) was charged to a three-gallon reactor equipped with a stirrer and a source of nitrogen. The kettle was purged with nitrogen while the contents of the kettle were heated to 130° C. The reactor was closed and 2 psig of nitrogen was added to the kettle. Propylene oxide (0.78 lb) was added to the reactor. The reaction was held at 130° C. until a constant pressure was reached. The amount recovered from the kettle was 9.68 lb.

EXAMPLE 36

Synthesis of DNP+10 PO+132 EO+5.PO

A product similar to Example 29 (9.00 lb) was charged to a three-gallon reactor equipped with a stirrer and a source of nitrogen. The kettle was purged with nitrogen while the contents of the kettle were heated to 130° C. The reactor was closed and 2 psig of nitrogen was added to the kettle. Propylene oxide (0.39 lb) was added to the reactor. The reaction was held at 130° C. until a constant pressure was reached. The amount recovered from the kettle was 9.35 lb.

EXAMPLE 37

Synthesis of DNP+10 PO+132 EO+20 PO

A product similar to Example 29 (9.00 lb) was charged to a three-gallon reactor equipped with a stirrer and a source of nitrogen. The kettle was purged with nitrogen while the contents of the kettle were heated to 130° C. The reactor was closed and 2 psig of nitrogen was added to the kettle. Propylene oxide (1.56 lb) was added to the reactor at a rate such that the pressure inside the reactor was below 60 psig. The reaction was held at 130° C. until a constant pressure was reached. The amount recovered from the kettle was 10.60 lb.

EXAMPLE 38

Synthesis of DNP+10 PO+132 EO+30 PO

A product similar to Example 29 (9.00 lb) was charged to a three-gallon reactor equipped with a stirrer and a source of nitrogen. The kettle was purged with nitrogen while the contents of the kettle were heated to 130° C. The reactor was closed and 2 psig of nitrogen were added to the kettle. Propylene oxide (2.34 lb) was added to the reactor at a rate such that the pressure inside the reactor was below 60 psig. The reaction was held at 130° C. until a constant pressure was reached. The amount recovered from the kettle was 11.25 lb.

EXAMPLE 39

Synthesis of DNP+10 PO+40 EO+(10 PO+10EO)+80 EO

To a three-gallon kettle equipped with a stirrer and a source of nitrogen, dinonylphenol (2.0 lb) and flaked potassium hydroxide (30.0 g) were charged. The kettle was purged with nitrogen while the contents of the kettle were heated to 130° C. The reactor was closed and 2 psig of nitrogen was added to the kettle. Propylene oxide (3.41 lb) was slowly added to the reactor such that the pressure in the reactor was 60 psig. When all of the propylene oxide was added, the contents of the reactor were heated at 130° C. until the pressure reached a constant value. The reactor was heated to 140° C. and ethylene oxide (10.35 lb) was added at a rate such that the pressure inside the reactor never went higher than 60 psig. The contents of the reactor were heated at 140° C. until the pressure reached a constant value. A mixed ethylene oxide/propylene oxide block (6.0 lb. 10 mole EO:10 mole PO) was added to the reactor as above. Following this, ethylene oxide (20.7 lb) was further added to the reactor. After digesting to constant pressure the material was removed from the reactor at 60° C.

EXAMPLE 40

Synthesis of DNP+10 PO+40 EO+(80 EO/20 PO)

To a three-gallon kettle equipped with a stirrer and a source of nitrogen, dinonylphenol (2.0 lb) and flaked potassium hydroxide (30.0 g) were charged. The kettle was purged with nitrogen while the contents of the kettle were heated to 130° C. The reactor was closed and 2 psig of nitrogen was added to the kettle. Propylene oxide (3.41 lb) was slowly added to the reactor such that the pressure in the reactor was 60 psig. When all of the propylene oxide was added, the contents of the reactor were heated at 130° C. until the pressure reached a constant value. The reactor was heated to 140° C. and ethylene oxide (10.35 lb) was added at a rate such that the pressure inside the reactor never went higher than 60 psig. The contents of the reactor were heated at 140° C. until the pressure reached a constant value. A mixed ethylene oxide/propylene oxide block (27.52 lb, 80 mole EO:20 mole PO) was added to the reactor as above. After digesting to constant pressure and cooling to 60° C., 43.02 lb of material was recovered.

EXAMPLE 41

Synthesis of DNP+10 PO+60 EO+10 PO+70 EO

To a three-gallon kettle equipped with a stirrer and a source of nitrogen, dinonylphenol (2.0 lb) and flaked potassium hydroxide (30.0 g) were charged. The kettle was purged with nitrogen while the contents of the kettle were heated to 130° C. The reactor was closed and 2 psig of nitrogen was added to the kettle. Propylene oxide (3.41 lb) was slowly added to the reactor such that the pressure in the reactor was 60 psig. When all of the propylene oxide was added, the contents of the reactor were heated at 130° C. until the pressure reached a constant value. The reactor was heated to 140° C. and ethylene oxide (15.55 lb) was added at a rate such that the pressure inside the reactor never went higher than 60 psig. The contents of the reactor were heated at 140° C. until the pressure reached a constant value. The reactor was cooled to 130° C. and propylene oxide (3.42 lb) was added to the reactor in the usual manner. Following this, ethylene oxide (18.30 lb) was added to the reactor at 140° C. in the usual manner. After digesting to constant pressure and cooling to 60° C., 43.30 lb of material were recovered.

EXAMPLE 42

Synthesis of DNP+60 EO+10 PO+70 EO

To a three-gallon kettle equipped with a stirrer and a source of nitrogen, dinonylphenol (2.0 lb) and flaked potassium hydroxide (20.0 g) were charged. The kettle was purged with nitrogen while the contents of the kettle were heated to 140° C. The reactor was closed and 2 psig of nitrogen was added to the kettle. Ethylene oxide (15.55 lb) was added at a rate such that the pressure inside the reactor never went higher than 60 psig. The contents of the reactor were heated at 140° C. until the pressure reached a constant value. The reactor was cooled to 130° C. and propylene oxide (3.42 lb) was added to the reactor in the usual manner. Following this, ethylene oxide (18.30 lb) was added to the reactor at 140° C. in the usual manner. After digesting to constant pressure and cooling to 60° C., the material was poured up.

EXAMPLE 43

Synthesis of 10 mole PO Adduct of Dinonylphenol

To a three-gallon kettle equipped with a stirrer and a source of nitrogen, dinonylphenol (7.0 lb) and aqueous potassium hydroxide (45%, 70.0 g) were charged. The kettle was purged with nitrogen while the contents of the kettle were heated to 130° C. for 40 minutes to remove the water. The reactor was closed and 2 psig of nitrogen was added to the kettle. Propylene oxide (11.94 lb) was slowly added to the reactor such that the pressure in the reactor was 60 psig. When all of the propylene oxide was added, the contents of the reactor were heated at 130° C. until the pressure reached a constant value. The reactor was cooled to 60° C. and the contents of the reactor were removed. The amount recovered from the kettle was 18.88 lb.

TABLE IV

Propoxylated, Highly Ethoxylated Thickeners and Fluids Therefrom

Example

TABLE IV-continued

Propoxylated, Highly Ethoxylated Thickeners and Fluids Therefrom

|  | 26 | 27 | 28 | 29 | 30 | 31 | 32 | 33 | 34 |
|---|---|---|---|---|---|---|---|---|---|
| Product Components | DNP 132EO | DNP 2PO 132EO | DNP 5PO 132EO | DNP 10PO 132EO | DNP 20PO 132EO | DNP 30PO 132EO | DNP 10PO 60EO | DNP 10PO 100EO | DNP 10PO 150EO |
| Percent of Product Needed to Thicken a Water-Glycol (40:60 by weight) Solution to 37.6 Centistokes at 40° C. | 11.20 | 10.39 | 9.79 | 7.89 | 9.08 | 11.30 | 12.48 | 9.39 | 7.38 |
| Physical Properties of the Thickening Agent |
| Pour Pt., °C. | 60.0 | 55.0 | 55.0 | 55.0 | 40.6 | 55.0 | 55.0 | 55.0 | 55.0 |
| Corrected OH No. | 11.0 | 10.80 | 10.10 | 6.36 | 9.00 | 9.07 | 21.30 | 22.40 | 6.20 |
| Viscosity, cs at 100° C. | 463 | 358 | 418 | 434 | 440 | 422 | 136 | 254 | 45.9 |

| | Example | | | | | | | |
|---|---|---|---|---|---|---|---|---|
| | 35 | 36 | 37 | 38 | 39 | 40 | 41 | 42 |
| Product Components | DNP 10PO 150EO 10PO | DNP 10PO 150EO 15PO | DNP 10PO 150EO 20PO | DNP 10PO 150EO 30PO | DNP 10PO 40EO 10PO/10EO 80EO | DNP 10PO 40EO 80EO 20PO | DNP 10PO 60EO 10PO 70EO | DNP 60EO 10EO 70EO |
| Percent of Product Needed to Thicken a Water-Glycol (40:60 by weight) Solution to 37.6 Centistokes at 40° C. | 10.38 | 10.31 | 10.55 | 10.87 | 11.39 | 12.20 | 12.09 | 14.21 |
| Physical Properties of the Thickening Agent |
| Pour Pt., °C. | 55.0 | 55.0 | 50.0 | 50.0 | 35.0 | 30.0 | 40.0 | 40.0 |
| Corrected OH No. | 13.10 | 10.70 | 13.90 | 15.10 | 11.63 | 12.20 | 13.50 | 14.1 |
| Viscosity, cs at 100° C. | 403 | 440 | 409 | 417 | 238 | 289 | Not determined | |

Many modifications may be made in the water-soluble thickeners of this invention without departing from the spirit and scope of thereof which are defined only in the appended claims. For example, one skilled in the art may routinely find that particular proportions of certain alkylene oxides, monohydric alcohol hydrophobes and large ethylene oxide blocks give thickeners with optimized results.

We claim:

1. A glycol-water based fluid comprising
   a. a glycol component
   b. water and
   c. an effective amount of a water soluble thickener prepared by the process consisting essentially of reacting
      (1) ethylene oxide with
      (2) a dinonylphenyl hydrophobe, such that the mole ratio of ethylene oxide to hydrophobe is in the range from 40:1 to 500:1.

2. The glycol-water based fluid of claim 1 in which the glycol component is an alkylene glycol selected from the group consisting of ethylene glycol and propylene glycol.

3. The glycol-water based fluid of claim 1 in which the weight ratio of glycol component to water ranges from 2:1 to 0.5:1 and the proportion of water soluble thickener ranges from 5 to 20 wt.% based on the combined glycol-water proportion.

4. A glycol-water based fluid comprising
   a. a glycol component
   b. water and
   c. an effective amount of a water soluble thickener prepared by the process consisting essentially of reacting
      (1) ethylene oxide with
      (2) a dinonylphenyl hydrophobe, such that the mole ratio of ethylene oxide to hydrophobe is in the range from 40:1 to 500:1 to give an intermediate thickener and
      (3) capping the intermediate thickener with at least one alkylene oxide component selected from the group consisting of propylene oxide, mixed propylene oxide and ethylene oxide, propylene oxide followed by ethylene oxide, and mixed propylene oxide and ethylene oxide followed by propylene oxide.

5. The glycol-water based fluid of claim 4 in which the glycol component is an alkylene glycol selected from the group consisting of ethylene glycol and propylene glycol.

6. The glycol-water based fluid of claim 4 in which the weight ratio of glycol component to water ranges from 2:1 to 0.5:1 and the proportion of water soluble thickener ranges from 5 to 20 wt.% based on the combined glycol-water proportion.

7. A glycol-water based fluid comprising
   a. a glycol component
   b. water and
   c. an effective amount of a water soluble thickeners prepared by the process consisting essentially of reacting
      (1) propylene oxide with a dinonylphenyl hydrophobe, such that the mole ratio of propylene oxide to hydrophobe is in the range of 8:1 to 15:1, to give an intermediate and
      (2) reacting ethylene oxide with the intermediate, such that the mole ratio of ethylene oxide to intermediate is in the range of 40:1 to 500:1.

8. The glycol-water based fluid of claim 7 in which the water soluble thickener is capped with at least one alkylene oxide component selected from the group consisting of propylene oxide, mixed propylene oxide/ethylene oxide, mixed propylene oxide/ethylene oxide followed by ethylene oxide, and mixed propylene oxide/ethylene oxide followed by propylene oxide.

9. The glycol-water based fluid of claim 7 in which the glycol component is an alkylene glycol selected from the group consisting of ethylene glycol and propylene glycol.

10. The glycol-water based fluid of claim 7 in which the weight ratio of glycol component to water ranged from 2:1 to 0.5:1 and the proportion of water soluble thickener ranges from 5 to 20 wt.% based on the combined glycol-water proportion.

11. The glycol-water based fluid of claim 1 in which the mole ratio of ethylene oxide to hydrophobe is in the range from 50:1 to 400:1.

12. The glycol-water based fluid of claim 4 in which the mole ratio of ethylene oxide to hydrophobe is in the range from 50:1 to 400:1.

13. The glycol-water based fluid of claim 7 in which the mole ratio of ethylene oxide to hydrophobe is in the range from 50:1 to 400:1.

14. The glycol-water based fluid of claim 7 in which the mole ratio of propylene oxide to hydrophobe is in the range of 8:1 to 12:1.

* * * * *